United States Patent [19]

Cameron

[11] Patent Number: 4,826,204
[45] Date of Patent: May 2, 1989

[54] LATERALLY OFFSET DUAL VOLUME AIR DAMPER SUSPENSION STRUT WITH MINIMIZED SIDE LOAD

[75] Inventor: David S. Cameron, Grosse Pointe Woods, Mich.

[73] Assignee: General Motors Corporation, Detroit, Mich.

[21] Appl. No.: 209,142

[22] Filed: Jun. 20, 1988

[51] Int. Cl.⁴ .................. B60G 3/06; B60G 11/26; F16F 9/04; F16F 9/22
[52] U.S. Cl. .................. 280/698; 267/64.21; 267/64.25; 280/711
[58] Field of Search ............ 267/64.11, 64.16, 64.21, 267/64.24, 64.25, 64.27, 122; 280/702, 711, 668, 693, 698, 672

[56] References Cited

U.S. PATENT DOCUMENTS

| | | | |
|---|---|---|---|
| 4,635,909 | 1/1987 | Gold | 267/64.21 |
| 4,655,438 | 4/1987 | Cameron | 267/64.24 X |
| 4,688,774 | 8/1987 | Warmuth | 267/64.24 X |
| 4,778,198 | 10/1988 | Gold | 280/702 |
| 4,779,893 | 10/1988 | Juechter | 280/668 |

Primary Examiner—Robert J. Oberleitner
Attorney, Agent, or Firm—Charles R. White

[57] ABSTRACT

This suspension strut has upper and lower air sleeves which when pressurized with air provide the air spring suspension of a vehicle and which are axially offset from one another so that a force couple is formed that provides a moment which counteracts the moment resulting from the tire contact patch acting at a distance from the lower ball joint. With the tire contact moment neutralized, the side loads on the bearing and other sliding components of the strut are eliminated or sharply reduced to increase efficiency of strut operation and enhance strut durability.

3 Claims, 1 Drawing Sheet

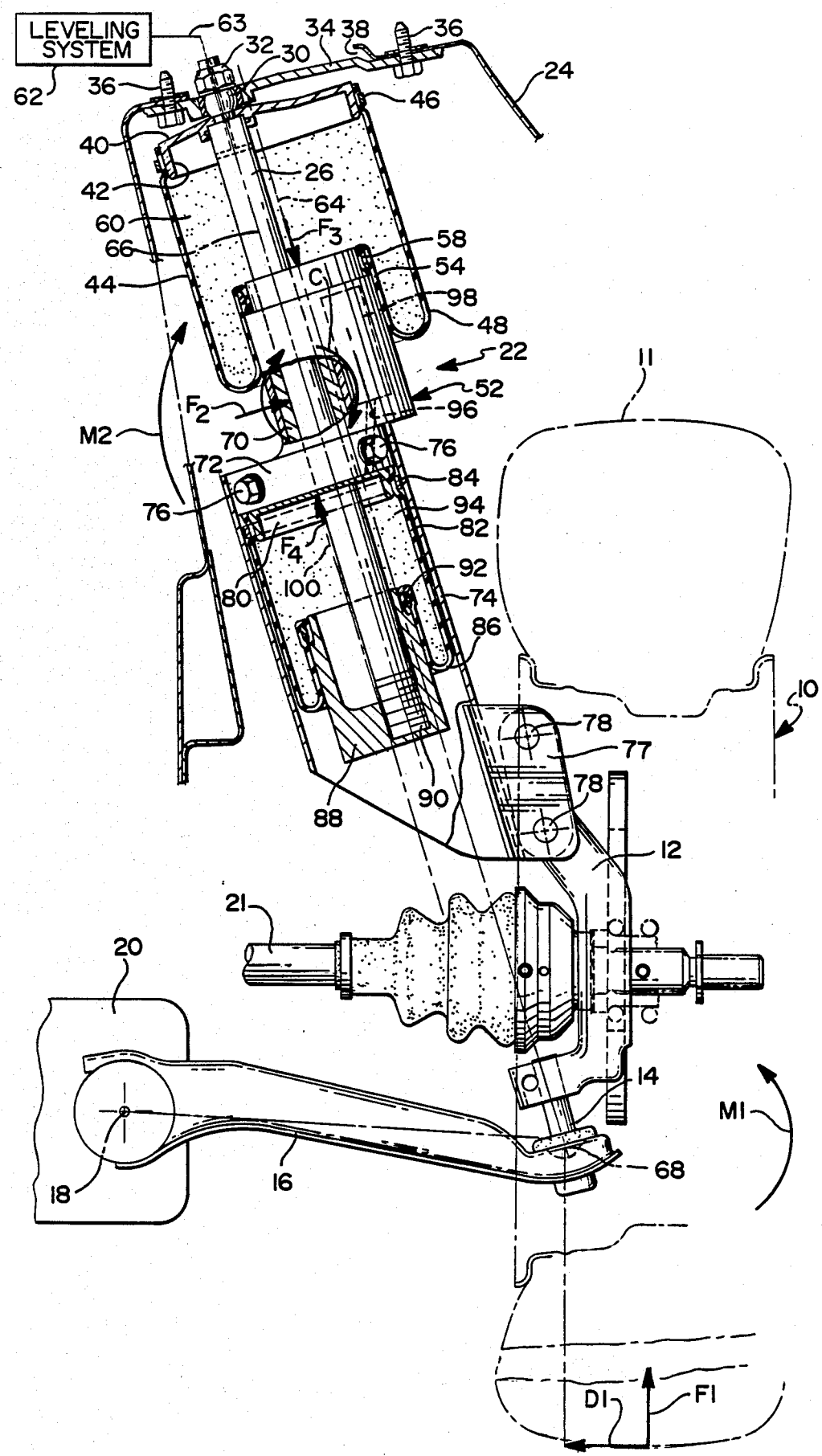

LATERALLY OFFSET DUAL VOLUME AIR DAMPER SUSPENSION STRUT WITH MINIMIZED SIDE LOAD

FIELD OF THE INVENTION

This invention relates to vehicle suspension struts and more particularly to a new and improved a pneumatic suspension strut operatively mounting a road wheel to support structure in a vehicle and featuring upper and lower pneumatic suspension springs which have centralized axes offset from one another to provide a force couple that generates a moment in opposition to a moment from road wheel patch load so that side loads on bearing components within the strut are minimized.

DESCRIPTION OF THE RELATED ART

Prior to the present invention various air spring dampers have been designed for a road wheel suspension in motor vehicles. For example in U.S. Pat. No. 4,635,909 an air spring suspension strut is set forth in which the spring suspension and spring damping functions and are unitized and are based upon pneumatics within the strut. While the air spring damper of U.S. Pat. No. 4,635,909 provides for effective spring suspension and damping, there is no provision for bearing side load compensation and this detracts from strut service life and operating efficiency.

In copending patent application Ser. No. 100,539, filed Sept. 24, 1987, now U.S. Pat. No. 4,779,893, assigned to the assignee of this invention, a strut type suspension is disclosed with side load compensation from a secondary spring element installed in the suspension to provide a moment to effectively neutralize the moment resulting from vertical tire loads. While side loads are effectively reduced in application Ser. No. 100,539, the secondary spring arrangement and mountings therefore are external of the strut and application is accordingly limited.

SUMMARY OF THE INVENTION

The present invention is of the general category as that of the above referenced U.S. Pat. No. 4,635,909 and application Ser. No. 100,539 but importantly features an integrated arrangement of upper and lower air springs with laterally offset longitudinal axes that provide for vehicle suspension and an internal force couple which counters the moment resulting from the vertical tire patch force to minimize lateral side loads that would otherwise occur.

BRIEF DESCRIPTION OF THE DRAWING

The drawing is an elevational front view with parts in section of the dual volume air spring damper of this invention.

DESCRIPTION OF THE PREFERRED EMBODIMENTS

Turning now in greater detail to the drawings there is shown in the FIGURE a steerable road wheel assembly 10 including pneumatic tire 11 for a vehicle operatively mounted on a steering knuckle 12 supported by means of a lower ball joint 14 to the outboard end of a lower control arm 16. The inboard end of the control arm pivots at 18 from a cross member of the engine cradle 20 or other support structure. The wheel assembly 10 is powered by a drive axle assembly 21 extending from the output of a differential not shown.

A dual volume air damper strut 22 provides the spring suspension operatively mounting the wheel assembly 10 to a mounting tower 24 provided in the body work of the vehicle. The strut 22 includes an elongated cylindrical strut rod 26 pivotally attached at its upper end by a spherical ball mount 30 and a retainer nut 32 to a disk-like upper mounting plate 34 that, in turn, is secured to the top or the strut tower 24 by threaded fasteners 36 to close the opening 38 therein.

Also secured to the strut rod 26 adjacent the upper end thereof is an upper air spring cap 40 having an annular depending flange 42 to which the upper end of a generally cylindrical air spring sleeve 44 of fabric reinforced elastomer material is attached by clamping ring 46. From this attachment, the air spring sleeve 44 extends downwardly to a rolling lobe 48 that moves over the outer surface of a cylindrical air spring piston and associated carrier 52. From rolling lobe 48 the sleeve 44 having a reduced diameter section 54, extends upwardly along the outer surface of the central piston and carrier 52 to an inner end that is secured by ring clamp 58 to the upper end thereof. The pneumatic chamber 60 defined by the air spring sleeve 44 is charged by a pump or other suitable source of a leveling system 62 through a line 63 operatively connected to rod 26. The axis 64 of the air spring is offset in an outboard direction from the axis 66 of rod 26 and, in a preferred embodiment intersects the pivot point 68 of the lower ball joint.

As shown in the drawing the strut rod slidably extends through a cylindrical dry bearing 70 supported within the air spring piston and carrier 52. As known in strut-type suspensions, such bearings are subject to high side loads and during operation the high friction increases operating temperatures and wear to adversely detract from strut efficiency and service life.

This central air spring piston and carrier carrier 52 has a lower cylindrical mounting shoulder 72 laterally offset from the cylindrical main body of the central carrier and air spring piston as shown in the drawing which serves as an attachment surface for an elongated restraining tube 74. Threaded fasteners 76 secure the upper end of the restraining tube 74 to the shoulder 72 while offset ears 77 on the lower end of this tube are attached to the steering knuckle by mounting bolts 78.

Also mounted within the restraining tube is a cap 80 having an annular flange to which one end of a lower air spring 82 of a fabric reinforced elastomer material is secured by clamping ring 84. This air spring extends downwardly along the interior surface of the restraining tube to a rolling lobe 86 which rolls along the surface of a lower air spring piston 88 that is retained in position being threadedly connected at 90 to the lower end of the strut rod 26. From the rolling lobe 86 the air spring sleeve 82 extends upward along the outer surface of the cylindrical lower piston 88 to the clamping ring 92 by means of which the sleeve is secured to the piston 88. The pneumatic chamber 94 defined by the rolling lobe air sleeve 82 is pneumatically interconnected to chamber 60 of the upper air sleeve by a passage 96 and a suitable flow restricting valve assembly 98 permitting the interchange of air between these chambers during strut operation and providing effective damping of the pneumatic spring suspension. The lower air spring has a longitudinal axis 100 offset and inboard from the axis 66 of the strut rod 26. With the offset axes of the upper and lower air spring, a force couple is produced that will neutralize or reduce the tire wheel path moment to reduce side loads otherwise affecting the dry bearing 70.

This is illustrated in the drawing in which the patch force F1 of the pneumatic tire 11 laterally offset from the ball joint pivot 68 by distance D1 results in a moment M1 about pivot 68 of the ball joint 14. The moment M1, if not adequately neutralized results in the application of a side load F2 to the bearing 70 and carrier 52. However with the upper and lower air spring laterally offset from one another, for example, such as illustrated in the drawing, upper and lower spring forces F3 and F4 generate a couple that results in a moment M2 which is counter to the tire moment M1 so that the side loads are effectively reduced or eliminated.

The dual sleeve design of this invention further provides increased flexibility in the packaging of the front strut. The couple generated by the upper and lower springs increase in direct proportion to the tire load and this condition is necessary for minimum side load through the total travel of the strut.

While a preferred embodiment of this invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. A suspension strut for mounting a road wheel assembly to support structure in a vehicle comprising lower connector means operatively secured to said road wheel assembly, a carrier means, means securing said carrier means to said connector means, a bearing in said carrier means, an elongated rod mounted for reciprocating sliding movement through said bearing, fastener means spaced above said carrier means for attaching an upper end of said rod to said support structure, upper air spring piston means associated with said carrier means, lower air spring piston means operatively disposed below said carrier means, upper air spring sleeve means having one end secured with respect to said elongated rod adjacent the upper end thereof and having a lower end secured to said upper air spring piston means, lower air spring sleeve means having an upper end secured to said carrier means and a lower end secured to said lower air spring piston means, air passage means pneumatically connecting pneumatic chambers defined by said upper and lower air spring sleeve means, mounting means for axially and laterally offsetting said chambers from one another to provide a force couple that results in a moment to substantially cancel the contact patch force of the road wheel of said assembly and thereby minimize side loading of said bearing.

2. A suspension strut for mounting a road wheel to support structure in a vehicle comprising a lower connector means operatively secured to a steerable road wheel assembly, a carrier means secured to said connector means, a bearing supported by said carrier means, an elongated rod mounted for reciprocating sliding movement through said bearing, attachment means for securing said rod to said support structure, an upper air spring piston means associated with said carrier means, a lower air spring piston operatively connected to a lower end of said rod and disposed below said carrier means, upper air spring sleeve means having an upper end secured with respect to the upper end of said rod and having a lower end secured to said upper air spring piston means, lower air spring sleeve means having an upper end secured with respect to said carrier means and a lower end secured to said lower air spring piston, air passage means pneumatically connecting chambers defined by said air spring sleeve means, air pressure means for supplying pressurized air to said chambers, said chambers being axially and laterally offset by said carrier means so that a force couple is formed on said carrier means to substantially cancel the tire contact patch force and thereby reduce side loading of said bearing.

3. In a vehicle, a road wheel assembly operatively mounted to a control arm, a suspension strut for mounting a road wheel to support structure in a vehicle, a lower restraining tube secured to a steering knuckle of the road wheel assembly, a carrier means secured to said restraining tube, a bearing supported by said carrier means, a strut rod mounted for reciprocating sliding movement through said bearing, means for operatively attaching the upper end of said rod to said support structure, an upper air spring piston means associated with said carrier means, a lower air spring piston means secured to the lower end of said rod, upper air spring sleeve means having one end secured with respect to said upper end of said strut rod and another end secured to said upper air spring piston means, lower air spring sleeve means having an upper end secured with respect to said carrier means and a lower end secured to said lower air spring piston, air passage means pneumatically connecting chambers defined by said air spring sleeve means, air pressure means for supplying pressurized air to said chambers, said chambers being axially and laterally offset by said carrier means so that a force couple is formed on said carrier means to substantially cancel the tire contact patch force of said road wheel and thereby reduce side loads of said bearing.

* * * * *